(12) United States Patent
Karhiniemi et al.

(10) Patent No.: US 8,063,330 B2
(45) Date of Patent: Nov. 22, 2011

(54) UNIFORM THRESHOLD FOR CAPACITIVE SENSING

(75) Inventors: Marko Karhiniemi, Espoo (FI); Jari Nousiainen, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 11/821,205

(22) Filed: Jun. 22, 2007

(65) Prior Publication Data

US 2008/0314725 A1     Dec. 25, 2008

(51) Int. Cl.
  *H03K 17/975*  (2006.01)
(52) U.S. Cl. ..................................... 200/600
(58) Field of Classification Search ............. 200/600
  See application file for complete search history.

(56) References Cited

U.S. PATENT DOCUMENTS

| | | | |
|---|---|---|---|
| 4,145,748 A | 3/1979 | Eichelberger et al. | 364/862 |
| 4,665,324 A * | 5/1987 | Ogino et al. | 307/126 |
| 6,002,389 A | 12/1999 | Kasser | 345/173 |
| 6,452,514 B1 | 9/2002 | Philipp | |
| 6,466,036 B1 | 10/2002 | Philipp | |
| 6,944,018 B2 * | 9/2005 | Caldwell | 361/679.4 |
| 7,232,973 B2 * | 6/2007 | Kaps et al. | 200/600 |
| 7,652,220 B2 * | 1/2010 | Weiss | 200/600 |
| 2003/0102875 A1 | 6/2003 | Fujiwara | 324/663 |
| 2005/0002168 A1 | 1/2005 | Narhi | 361/800 |
| 2006/0038791 A1 | 2/2006 | Mackey | 345/173 |
| 2006/0207806 A1 | 9/2006 | Philipp | |
| 2006/0266640 A1 | 11/2006 | Halsey | 204/192.29 |
| 2007/0051610 A1 * | 3/2007 | Weiss | 200/600 |
| 2007/0144795 A1 | 6/2007 | Tran | 178/18.06 |
| 2008/0060920 A1 * | 3/2008 | Aksyuk et al. | 200/181 |
| 2008/0223708 A1 * | 9/2008 | Joo | 200/600 |

FOREIGN PATENT DOCUMENTS

| | | |
|---|---|---|
| EP | 1 293 928 A2 | 3/2003 |
| GB | 1120097 | 7/1968 |
| WO | 01/95358 A2 | 12/2001 |

* cited by examiner

*Primary Examiner* — Renee Luebke
*Assistant Examiner* — Lheiren Mae Caroc

(57) ABSTRACT

The specification and drawings present a new apparatus and method for providing and using a uniform threshold for capacitive touch sensing in a user interface having a non-flat touch surface. The capacitive touch sensor can to provide a sensor signal using the uniform capacitance threshold level as a function of a location of an object (e.g., finger, stylus, etc.) on or near the non-flat touch surface of a user interface module using a substantially uniform distance between the non-flat touch surface and a capacitive touch sensor layer, and/or using a gradient of a dielectric constant of materials between the non-flat touch surface and the capacitive touch sensor layer according to a predetermined criterion.

24 Claims, 6 Drawing Sheets

UNIFORM THRESHOLD FOR CAPACITIVE SENSING

TECHNICAL FIELD

The present invention relates generally to electronic devices and, more specifically, to uniform threshold for capacitive touch sensing in a user interface having a non-flat touch surface.

BACKGROUND ART

User input means (such as a user interface) of an electronic device can be implemented in various ways. Touch pads, keyboards, keymats, touch-screen, etc. are well known user interfaces especially for portable devices as laptop computers and mobile telephones. A touch pad is an input device which typically includes a sensor and an associate circuitry. When a user moves a stylus or a finger to touch (or to put in a close proximity) the touch pad, that contact effects the sensor and is detected by the circuitry. There are various mechanisms for detecting the point of contact on the touch pad.

One approach for detecting a user input is generating an electrical field and detecting a deformation of the electric field by a user. The electric field can be generated, for instance, within the area of a touch-screen. The disturbance of that field caused by the object may then depend on the position at which the touch-screen is touched by the object (e.g., stylus, finger of the user, etc.). For generating and monitoring such an electrical field, different sensor technologies can be employed. One option is to use a capacitive detection.

Among multiple capacitive touch pad principles, a capacitive detector can comprise at least one conductive plate or electrode (element X), which forms a capacitance with at least one another conductive plate or electrode (element Y) as shown in FIG. 1. In this capacitive detector, an electric filed is set between these electrodes. Then the disturbances of the electric field induced, for example, by a user finger (e.g., by touching, which can act as grounding or disturbing element) can be detected by monitoring the capacitance value between elements X and Y as shown in FIG. 1. Thus capacitance values (i.e., changes in the disturbed electric field) can be used for detecting whether there is some object in close vicinity of the detector or not, and at which position. This principle can be used in a matrix type grid sensor arrangement with rx and tx electrodes separated by a gap, wherein the object (e.g., a finger) causes disturbances in coupling the signal which is detected by the measurement circuitry, as disclosed, for example, in U.S. Pat. No. 6,452,514 "Capacitive Sensor and Array" by H. Philipp.

There are other multiple alternative methods and variations in the measurement technique in using the capacitance measurement for detection. For example, principles, disclosed in U.S. Pat. No. 6,466,036 "Charge Transfer Capacitance Measurement Circuit" by H. Philipp, can be applied to semi-conductive plate (or possibly to a conductive plate) to measure the location of the finger as well, using the following. Charge pulses can be injected from a number of electrodes placed around the touch plane (e.g., semiconducting touch plane) at least three preferably at least four electrodes. There can be more electrodes for increased accuracy and performance. These charge pulses generate electric field around the semi-conductive plane and the finger absorbs energy of some of the pulses (capacitive connection to the plane). The injected charges are collected and counted. The sensing electrodes from the corners of the touch plane have resistance values to the point which forms the capacitance connection to the finger, i.e., changes in the resistance can be detected as changes in an electric current (resistive-capacitive detection). Relative resistance values determine the distances from the corners indicating coordinate values.

The finger (or another object) can interfere with the measurement arrangement by acting, for example, as a grounding element (e.g., by absorbing energy from the electric field). Thus the touch signal sensing strength can be dependent on the distance of the finger from the sensing element. In many cases the overlaying materials and structures on the touch pad are not flat which can cause uneven capacitive sensor signals. In other words, in case of applications with non-flat touch pads, it is difficult to set a certain capacitive value as a threshold value for a touch indication, because this touch capacitive value is different between locations where the finger touches on the touching pad. This can generate signal difference for different locations on the touch pad which may cause nonlinearity in analog capacitive touch sensing.

DISCLOSURE OF THE INVENTION

According to a first aspect of the invention, an apparatus, comprises: a user interface layer comprising a non-flat touch surface; and a capacitive touch sensor layer, configured to provide a sensor signal using a uniform capacitance threshold level as a function of a location of an object on or near the non-flat touch surface when the object touches or is in a close proximity to the non-flat touch surface, wherein the uniform capacitance threshold level is provided by at least one of: a substantially uniform distance between the non-flat touch surface and the capacitive touch sensor layer, and a gradient of a dielectric constant of materials between the non-flat touch surface and the capacitive touch sensor layer according to a predetermined criterion.

According further to the first aspect of the invention, the user interface layer and capacitive touch sensor layer may be parts of a user interface module.

Further according to the first aspect of the invention, the substantially uniform distance may be provided by bending the capacitive touch sensor layer to follow a shape of the non-flat touch surface. Still further, the capacitive touch sensor layer may be inserted inside of the user interface layer.

Still further according to the first aspect of the invention, the capacitive touch sensor layer may be made of a semiconducting material.

According further to the first aspect of the invention, the capacitive touch sensor layer may be manufactured by molding.

According still further to the first aspect of the invention, the gradient of a dielectric constant may be provided by using a higher dielectric constant material between the non-flat touch surface and the capacitive touch sensor layer in corresponding areas if a distance between the non-flat touch surface and the capacitive touch sensor layer in the corresponding areas is larger than in other areas between the non-flat touch surface and the capacitive touch sensor layer.

According further still to the first aspect of the invention, the uniform capacitance threshold level may be provided by using simultaneously the substantially uniform distance and the gradient of the dielectric constant.

According yet further still to the first aspect of the invention, the apparatus may be an electronic device configured for wireless communications.

According to a second aspect of the invention, a user interface module, comprises: a user interface layer comprising a non-flat touch surface; and a capacitive touch sensor layer, configured to provide a sensor signal using a uniform capacitance threshold level as a function of a location of an object on or near the non-flat touch surface when the object touches or is in a close proximity to the non-flat touch surface, wherein the uniform capacitance threshold level is provided by at least one of: a substantially uniform distance between the non-flat touch surface and the capacitive touch sensor layer, and a gradient of a dielectric constant of materials between the non-flat touch surface and the capacitive touch sensor layer according to a predetermined criterion, wherein the user interface module is configured to be used with an electronic device.

According further to the second aspect of the invention, the user interface module may be a part of the electronic device.

Further according to the second aspect of the invention, the user interface module may be connected to the electronic device by an electrical or a wireless connection.

Still further according to the second aspect of the invention, the substantially uniform distance may be provided by bending the capacitive touch sensor layer to follow a shape of the non-flat touch surface. Yet still further, the capacitive touch sensor layer may be inserted inside of the user interface layer.

According further to the second aspect of the invention, the capacitive touch sensor layer may be made of a semiconducting material.

According still further to the second aspect of the invention, the capacitive touch sensor layer may be manufactured by molding.

According further still to the second aspect of the invention, the gradient of a dielectric constant may be provided by using a higher dielectric constant material between the non-flat touch surface and the capacitive touch sensor layer in corresponding areas if a distance between the non-flat touch surface and the capacitive touch sensor layer in the corresponding areas is larger than in other areas between the non-flat touch surface and the capacitive touch sensor layer.

According yet further still to the second aspect of the invention, the uniform capacitance threshold level may be provided by using simultaneously the substantially uniform distance and the gradient of the dielectric constant.

According to a third aspect of the invention, a method, comprises: touching a non-flat touch surface of a user interface layer by an object; and providing by a capacitive touch sensor layer a sensor signal with a uniform capacitance threshold level as a function of a location on the non-flat touch surface when an object touches or is in a close proximity to the non-flat touch surface, wherein the uniform capacitance threshold level is provided by at least one of: a substantially uniform distance between the non-flat touch surface and the capacitive touch sensor layer, and a gradient of a dielectric constant of materials between the non-flat touch surface and the capacitive touch sensor layer according to a predetermined criterion.

According further to the third aspect of the invention, the substantially uniform distance may be provided by bending the capacitive touch sensor layer to follow a shape of the non-flat touch surface. Still further, the capacitive touch sensor layer may be inserted inside of the user interface layer.

Further according to the third aspect of the invention, the gradient of a dielectric constant may be provided by using a higher dielectric constant material between the non-flat touch surface and the capacitive touch sensor layer in corresponding areas if a distance between the non-flat touch surface and the capacitive touch sensor layer in the corresponding areas is larger than in other areas between the non-flat touch surface and the capacitive touch sensor layer.

Still further according to the third aspect of the invention, the uniform capacitance threshold level may be provided by using simultaneously the substantially uniform distance and the gradient of the dielectric constant.

According further to the third aspect of the invention, the user interface layer and capacitive touch sensor layer may be parts of a user interface module.

BRIEF DESCRIPTION OF THE DRAWINGS

For a better understanding of the nature and objects of the present invention, reference is made to the following detailed description taken in conjunction with the following drawings, in which.

MODES FOR CARRYING OUT THE INVENTION

Figure 1:
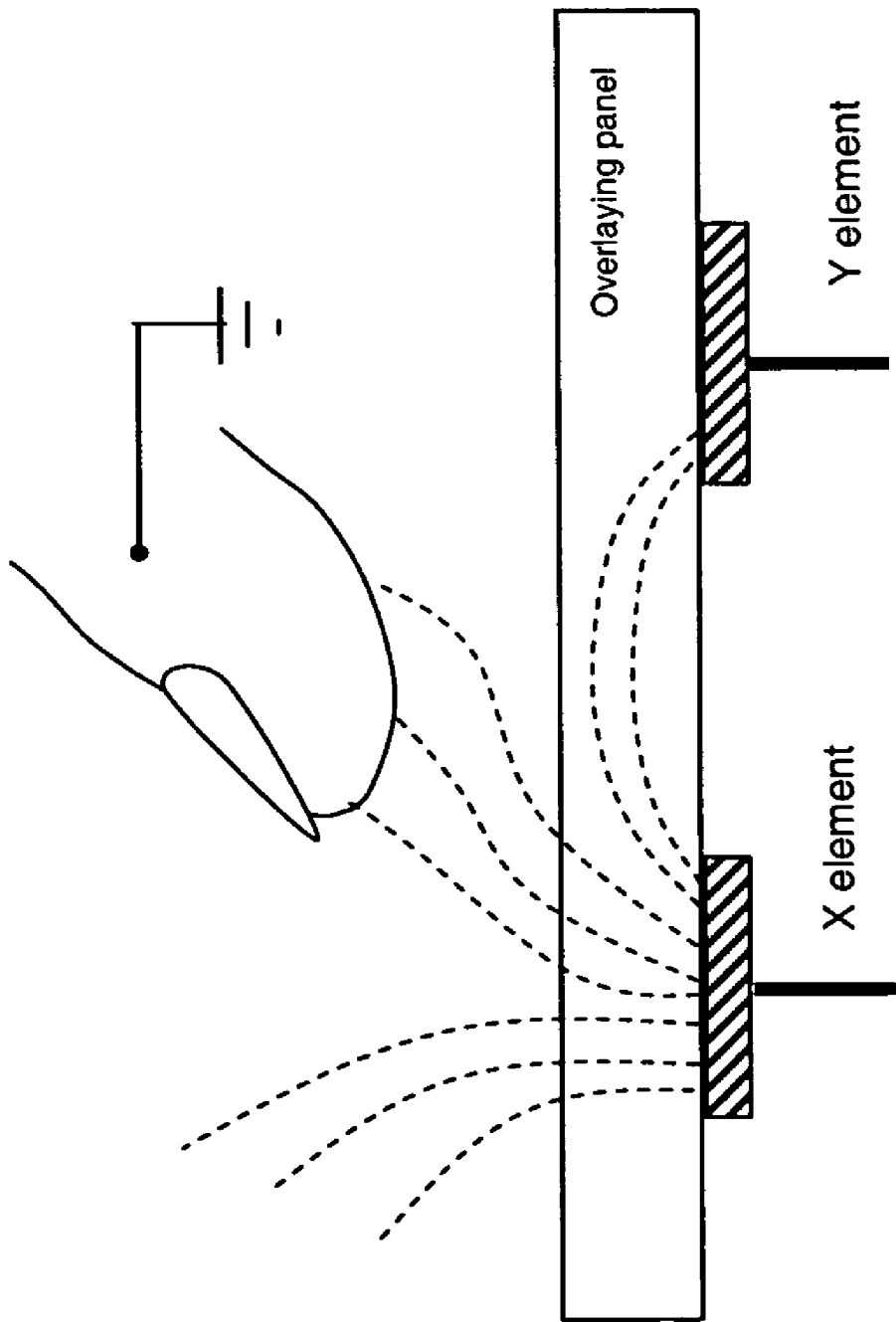
FIG. 1 is a schematic representation of a capacitive touch sensing principle.

A new apparatus and method are presented for providing and using a uniform threshold for capacitive touch sensing in a user interface having a non-flat touch surface. According to an embodiment of the present invention, a capacitive touch sensor layer (comprising capacitive sensor/sensors) can be configured to provide a sensor signal using the uniform capacitance threshold level (for providing, e.g., capacitive sensor linearization) as a function of a location of an object (e.g., finger, stylus, etc.) on or near the non-flat touch surface of a user interface module (e.g., touch pads, keyboards, keymats, touch-screen, etc.) when said object touches or is in a close proximity to the non-flat touch surface, wherein the uniform capacitance threshold level is provided by a substantially uniform distance between the non-flat touch surface and said capacitive touch sensor layer, and/or by a gradient of a dielectric constant of materials between the non-flat touch surface and the capacitive touch sensor layer according to a predetermined criterion. It is noted that the capacitive touch sensor layer can be made of a semiconducting material and/or manufactured by molding. It can be a part of the user interface module or can be a separate part.

It is noted that the term "non-flat touch surface" has a broad interpretation in the context of various embodiments of the present invention. One interpretation is when the "non-flat touch surface" is mechanically non-flat, e.g., having domes or other protrusions. Another interpretation is related to the case when the "non-flat touch surface" is mechanically flat but the dielectric constant of various components between the "non-flat touch surface" and the capacitive touch sensor layer varies through the "non-flat touch surface" which needs to be compensated for providing said uniform capacitance threshold level as a function of the location of an object on or near the "non-flat touch surface", as described herein.

According to a further embodiment of the present invention, said substantially uniform distance can be provided by bending the capacitive touch sensor layer to follow a shape of the non-flat touch surface: for example the capacitive touch sensor layer can be inserted inside of the user interface layer. According to still further embodiment of the present invention, said gradient of the dielectric constant can be provided, for example, by using a higher dielectric constant material between the non-flat touch surface of the user interface module and the capacitive touch sensor layer in corresponding areas if a distance between the non-flat touch surface and the capacitive touch sensor layer in those corresponding areas is larger than said distance in other areas between the non-flat touch surface and the capacitive touch sensor layer. Apparently for smaller such distances the dielectric constant in those areas is smaller.

It is further noted that the capacitive touch sensor layer, according to embodiments of the present invention, can comprise various known types of capacitive sensors covering multiple measuring principles, e.g., for x-y position calculations using and/or as a combination of individual sensors located in predetermined areas on the non-flat touch surface of the user interface module, for example, for providing predetermined commands to the electronic device.

There are multiple alternatives for the capacitive touch sensor layer depending on the measurement principle and measurement arrangement as briefly described in the Background section. For example, the capacitive touch sensor layer can be homogenous and semi-conductive with a resistivity, e.g., 500 Ohms/square to 50 kOhms/square (or possibly conducting) using a principle outlined in the U.S. Pat. No. 6,466,036 "Charge Transfer Capacitance Measurement Circuit" by H. Philipp. The capacitive touch sensor layer can be a matrix type of grid, using a measurement principle outlined in the U.S. Pat. No. 6,452,514 "Capacitive Sensor and Array" by H. Philipp (in this method the sensor electrodes are preferably conductive but can be semi-conductive as well). It is further noted that combinations and variations in the measurement principles and arrangements are possible. Since the electric fields are different in different sensor arrangement and measurement principle, thus, the dielectric variations should be applicable and implemented depending on the measurement principle and arrangement.

Figure 2:
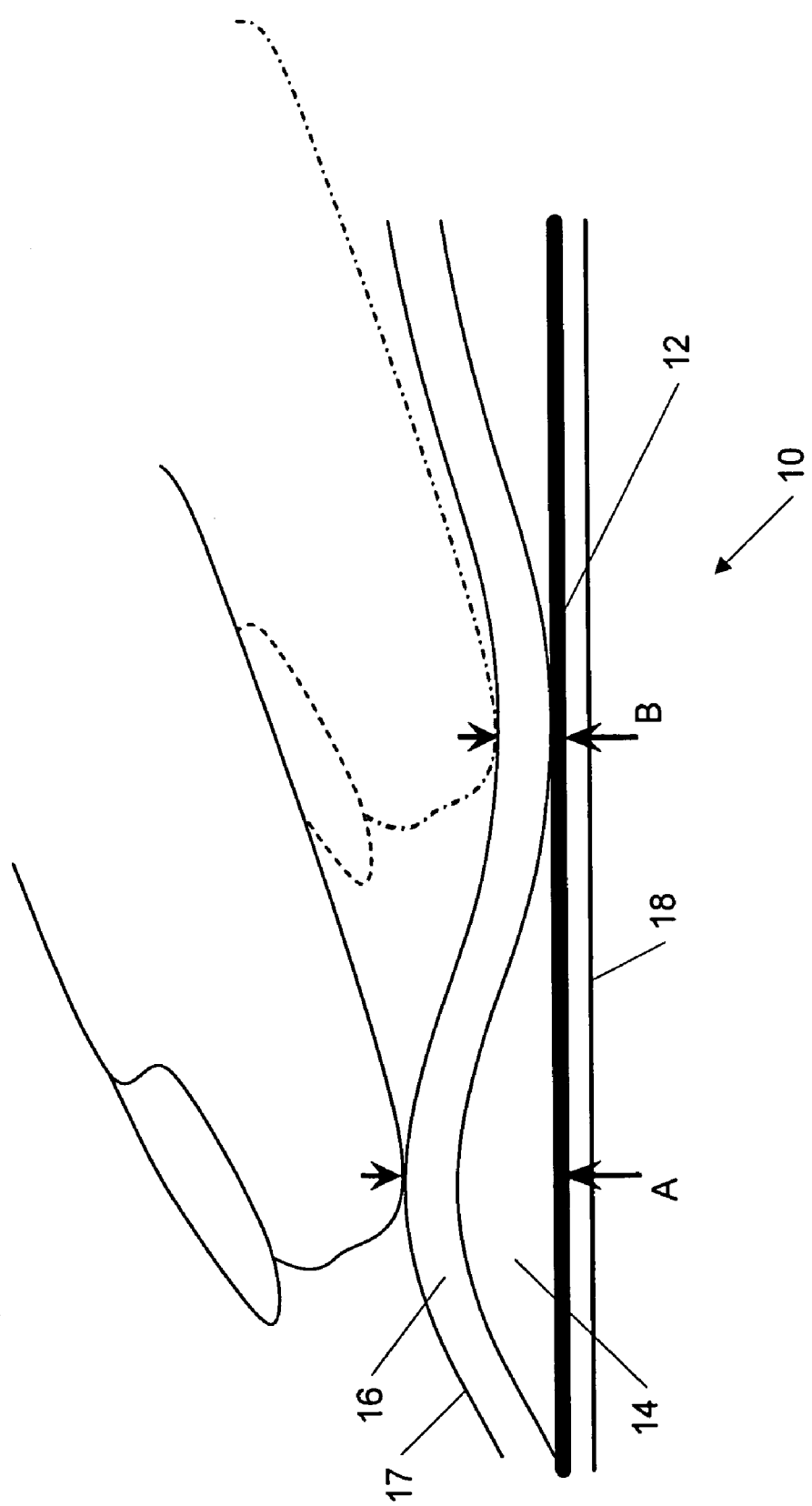
FIG. 2 is a schematic representation of capacitive touch sensing using a non-flat touch surface of a user interface without providing a uniform capacitance threshold level for capacitive sensing.

FIG. 2 shows one example among others of a schematic representation of capacitive touch sensing using non-flat touch surface of a user interface layer 16 of a user interface module 10 without providing a uniform capacitance threshold level for capacitive sensing. The non-flat surface 17 of the user interface layer 16 is bended in order to provide a space for domes 14 (the areas of domes 14 can be used, for example, for communicating information through the user interface by other than capacitive touch methods, as known in the art). As seen in FIG. 2, the distances A and B between the non-flat touch surface 17 of the user interface layer 16 and a flat (normal) capacitive touch sensor layer 12 (typically placed below the user interface layer 16) are not equal which may cause a problem for defining a uniform capacitance threshold level as a function of the location of an object on or near said non-flat touch surface 17 when said object touches or is in a close proximity to the non-flat touch surface 17. The capacitive touch sensor layer 12 can be supported by a rigid material layer 18, e.g., phone chassis. The user interface layer 16 can be made of a plastic or rubber (e.g., silicon rubber) material.

Figure 3:
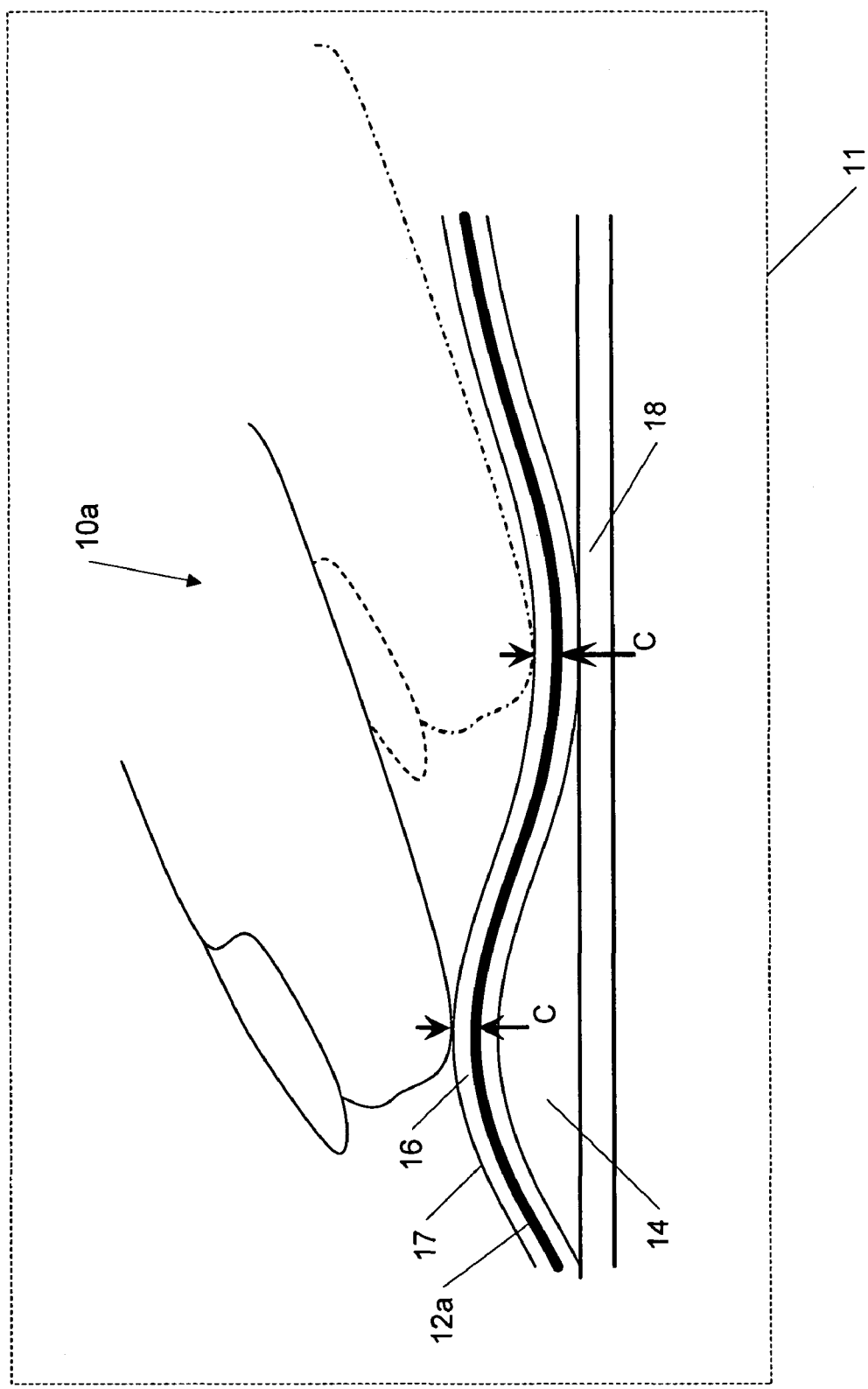
FIG. 3 is a schematic representation of capacitive touch sensing using a non-flat touch surface of a user interface by providing a uniform capacitance threshold level for capacitive sensing using a uniform distance between the non-flat touch surface and a capacitive touch sensor layer, according to an embodiment of the present invention.
Figure 4:
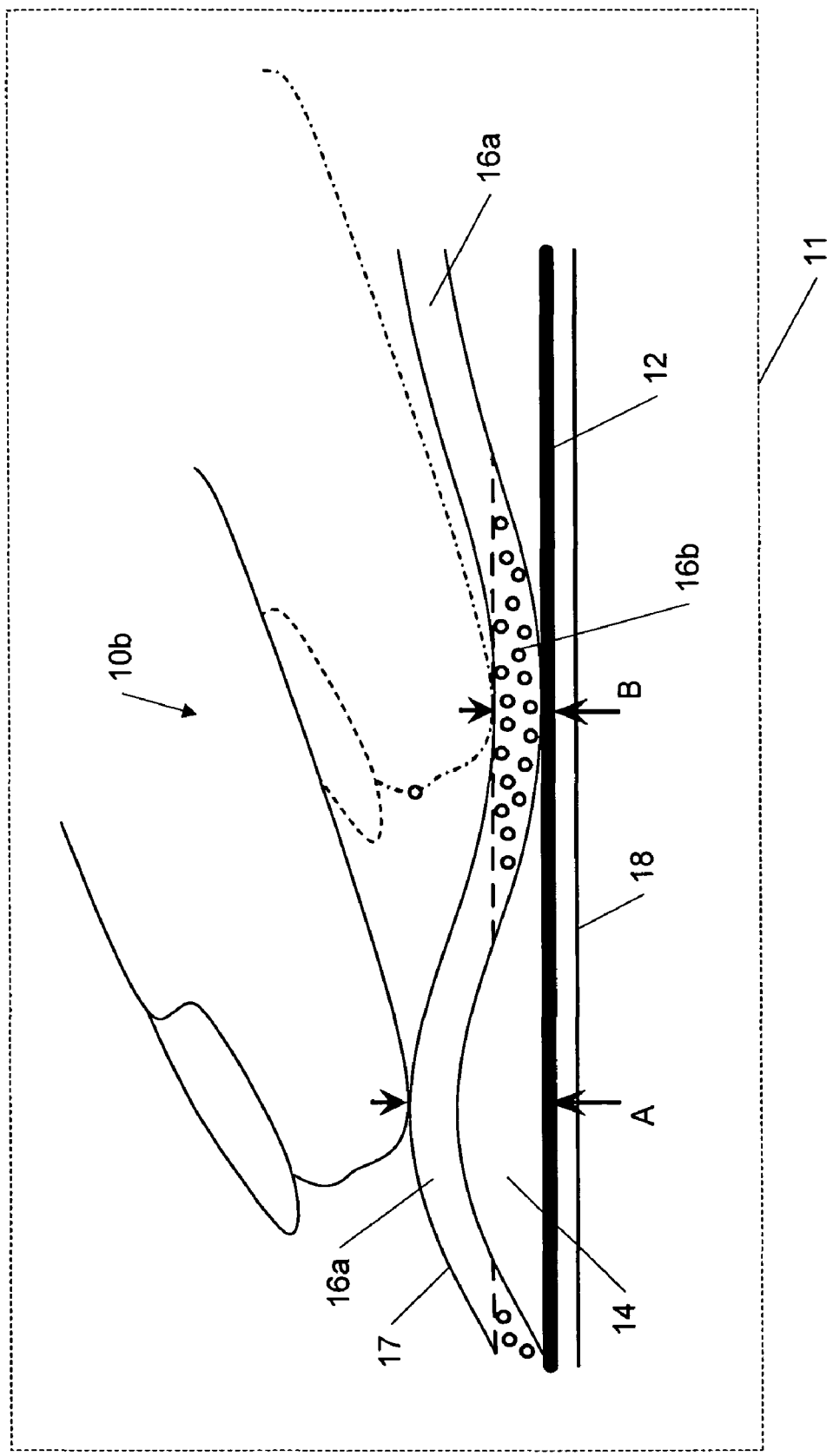
FIG. 4 is a schematic representation of capacitive touch sensing using a non-flat touch surface of a user interface by providing a uniform capacitance threshold level for capacitive sensing using a gradient of a dielectric constant of materials between the non-flat touch surface and a capacitive touch sensor layer, according to an embodiment of the present invention.
Figure 5:
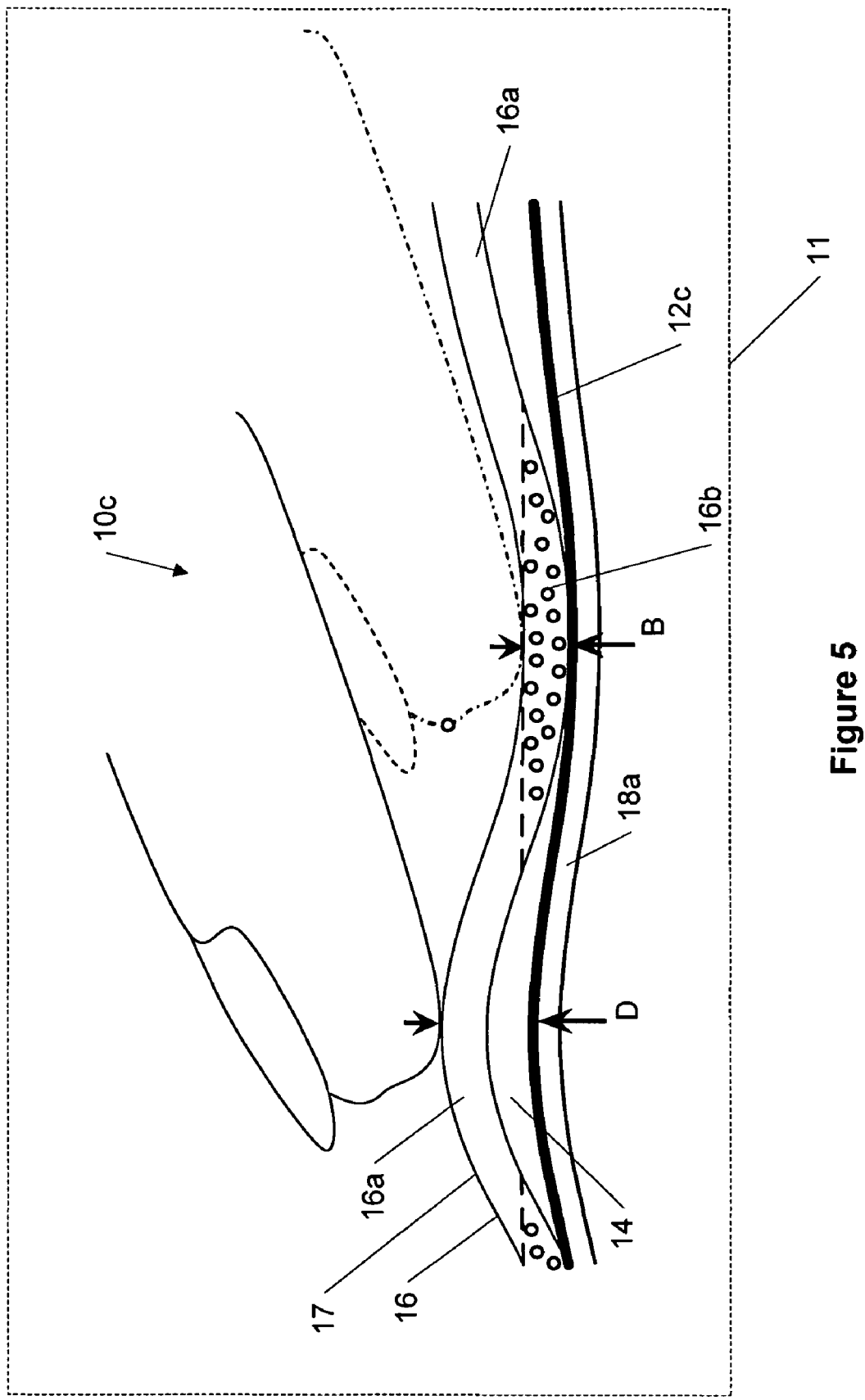
FIG. 5 is a schematic representation of capacitive touch sensing using a non-flat touch surface of a user interface by providing a uniform capacitance threshold level for capacitive sensing using a combination of a substantially uniform distance between the non-flat touch surface and a capacitive touch sensor layer, and of a gradient of a dielectric constant of materials between the non-flat touch surface and the capacitive touch sensor layer, according to an embodiment of the present invention.

The solutions for resolving non-uniformity of the capacitance threshold level identified in FIG. 2 are demonstrated in FIGS. 3-5, according to various embodiments of the present invention.

FIG. 3 shows an example among others of a schematic representation of capacitive touch sensing using the non-flat touch surface 17 of a user interface layer 16 of the user interface module 10a (e.g., touch pads, keyboards, keymats, touch-screens, etc.) comprised in an electronic device 11 by providing a uniform capacitance threshold level for the capacitive sensing using a uniform distance between the non-flat touch surface 17 and a bended capacitive touch sensor layer 12a, according to one embodiment of the present invention. The electronic device 11 can be, but is not limited to, a wireless portable device, a mobile communication device, a mobile phone, a computer, an electronic communication device, an electronic game device, a personal digital assistant device, etc.

It is noted that the user interface module 10a can be a part of the electronic device 11 or the module 10a can be a separate unit (e.g., a remote control) from an electronic device 11. In this case, the module 10a can be connected to the electronic device 11 by an electrical or a wireless connection. The same is applied to the examples of FIGS. 4 and 5.

The components of the user interface module 10a are primarily the same as shown in FIG. 2 except that the flat capacitive touch sensor layer 12 of FIG. 2 is modified: bended and integrated within the user interface layer 16 made, e.g., of a bendable plastic/rubber material, and it is shown as the bended capacitive touch sensor layer 12a in FIG. 3. It is seen from FIG. 3 that distance C is the same across the non-flat touch surface 17, thus providing the uniform capacitance threshold level as a function of a location of the object (e.g., a finger) on or near the non-flat touch surface 17 for generating the sensor signal as described herein.

The approach shown in FIG. 3 requires a bendable solution for the capacitive touch sensor layer. It is noted that the bended capacitive touch sensor layer 12a, according to embodiments of the present invention, can comprise various known types of capacitive sensors covering multiple measuring principles, e.g., for x-y position calculations or as a combination of individual sensors (as described herein), for example, for providing a predetermined command to the electronic device 11, wherein the touch areas on the non-flat touch surface 17 for applying those commands by touching can be complimentary to the areas over the domes 14. Materials used for bendable sensors can include (but are not limited to) silver or graphite pastes or inks, conductive polymers, etc.

The associate circuitry for generating a sensor output signal is not shown in FIG. 3 and further in FIGS. 4 and 5 but it is well known to a person skilled in the art.

FIG. 4 shows an example among others of a schematic representation of capacitive touch sensing using the non-flat touch surface 17 of the user interface layer 16 of the user interface module 10b (e.g., touch pads, keyboards, keymats, touch-screens, etc.) comprised in an electronic device 11 by providing the uniform capacitance threshold level for the capacitive sensing using a gradient of the dielectric constant of materials between the non-flat touch surface 17 and a flat capacitive touch sensor layer 12, according to an embodiment of the present invention.

The component of the user interface module 10b are primarily the same as shown in FIG. 2 except that the dielectric constant of material in an area 16a of the user interface layer 16 over the dome 14 is higher than in an area 16b outside of the dome area 14. This gradient in the dielectric constant in the areas 16a and 16b compensates for the difference in distances A and B to provide the uniform capacitance threshold level as a function of a location of an object on or near the non-flat touch surface 17 for generating the sensor signal as described herein. The capacitive touch sensor layer 12 can be integrated within the rigid support layer 14 (e.g., inside or on the top) as shown in FIG. 4 and can be implemented and function as described in reference to FIG. 3. It is further noted that other materials in the dome space 14 can be also used for providing said gradient of a dielectric constant of materials needed for establishing the uniform capacitance threshold level as described herein.

Various laminating materials for facilitating the gradient of the dielectric constant can be (but are not limited to) polyethylene, silicon, semi-conductors or other compound materials. The choice of the appropriate materials may depend on the way the electric field needs to be altered, shaped and/or guided in the materials. It is noted that air/space and possibly conductive particles between the finger and the sensor can also act as a part of the circuit creating capacitance value to be measured.

FIG. 5 shows an example among others of a schematic representation of capacitive touch sensing using the non-flat touch surface 17 of the user interface layer 16 of the user interface module 10c (e.g., touch pads, keyboards, keymats, touch-screens, etc.) comprised in an electronic device 11 by providing a uniform capacitance threshold level for capacitive sensing using a combination of a) a substantially uniform distance between the non-flat touch surface 17 and a capacitive touch sensor layer 12c and b) a gradient of the dielectric constant of materials between the non-flat touch surface 17 and the capacitive touch sensor layer 12c, according to an embodiment of the present invention. The example of FIG. 5 demonstrates a combination approach utilizing combined techniques of examples of FIGS. 3 and 4.

The component of the user interface module 10c are primarily the same as shown in FIG. 4 except that the capacitive touch sensor layer 12 shown in FIG. 4 is slightly bended and integrated within or on the top of the semi-rigid layer 18. Then the distance D shown in FIG. 5 is smaller than the distance A of FIG. 4 but still larger than the distance B shown in FIG. 4. Further needed compensation is provided by the gradient in dielectric constant of materials in the areas 16a and 16b as described in regard to FIG. 4.

Figure 6:
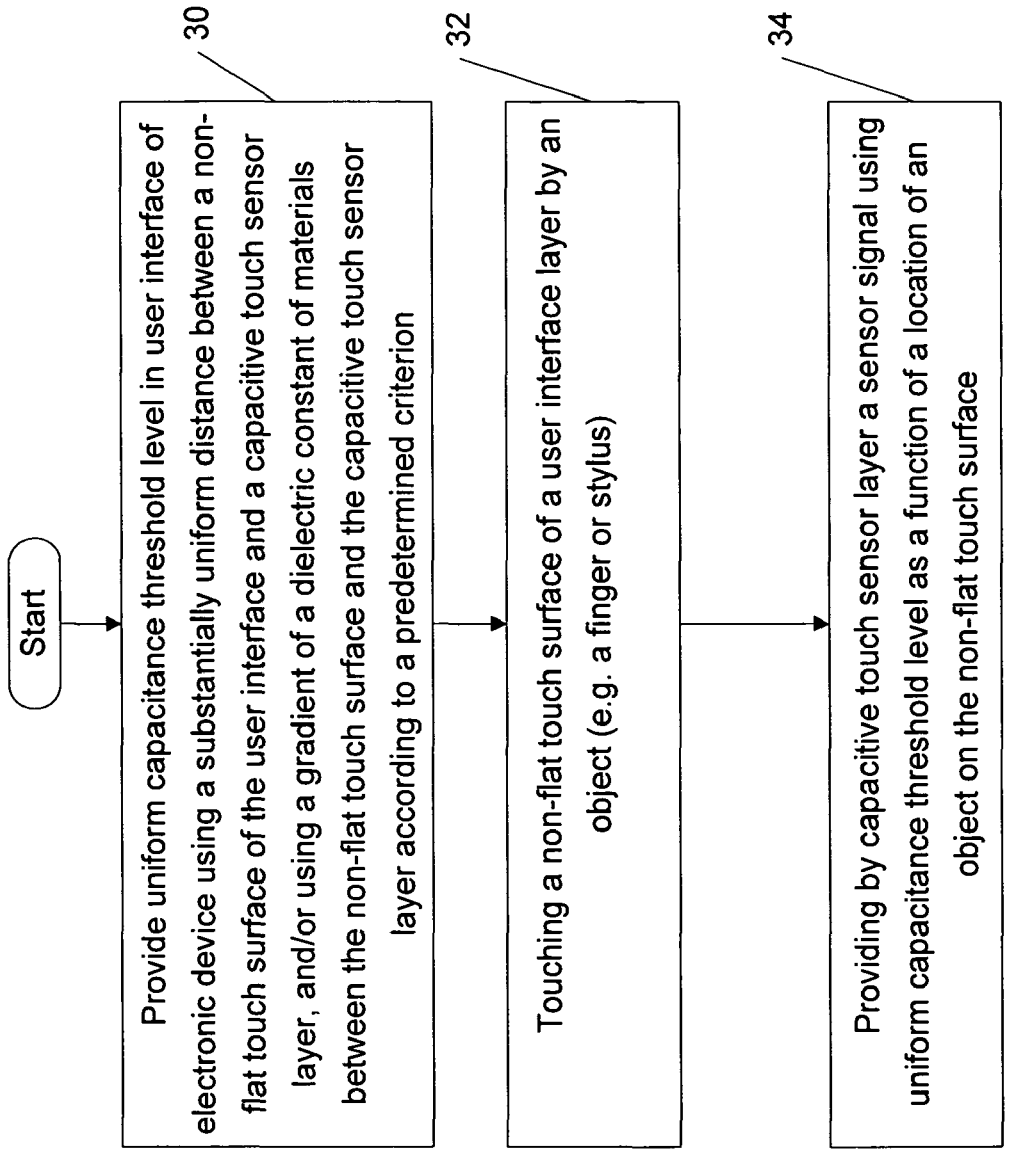
FIG. 6 is a flow chart demonstrating capacitive touch sensing using a non-flat touch surface of a user interface by providing a uniform capacitance threshold level for capacitive sensing, according to an embodiment of the present invention.

FIG. 6 shows a flow chart demonstrating capacitive touch sensing using a non-flat touch surface of user interface by providing a uniform capacitance threshold level for capacitive sensing, according to an embodiment of the present invention.

The flow chart of FIG. 6 only represents one possible scenario among others. It is noted that the order of steps shown in FIG. 6 is not absolutely required, so in principle, the various steps can be performed out of order. In a method according to the embodiments of the present invention, in a first step 30, a uniform capacitance threshold level (e.g., for providing a capacitive sensor linearization) in a user interface of the electronic device is provided by using a substantially uniform distance between a non-flat touch surface of the user interface and a capacitive touch sensor layer, and/or by using a gradient of a dielectric constant of materials between the non-flat touch surface and the capacitive touch sensor layer according to a predetermined criterion, as described herein.

In a next step 32, the non-flat touch surface of the user interface layer is touched by an object (e.g. a finger or a stylus). In a next step 34, the capacitive touch sensor layer provides a sensor signal using the uniform capacitance threshold level as a function of a location of an object on the non-flat touch surface.

It is noted that various embodiments of the present invention recited herein can be used separately, combined or selectively combined for specific applications.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. An apparatus, comprising:
   a user interface layer comprising a non-flat touch surface;
   a capacitive touch sensor layer, located outside of and non-touching said user interface layer along portions of the capacitive touch sensor layer, and configured to provide a sensor signal using a uniform capacitance threshold level for capacitive touch sensing at the non-flat touch surface; and
   material between said non-flat touch surface and said capacitive touch sensor layer, wherein the combination of said capacitive touch sensor layer and said material is configured to provide a uniform capacitance level at the non-flat touch surface, wherein said uniform capacitance level is provided, at least partly, by modulating a distance between said non-flat touch surface and said capacitive touch sensor layer by bending said capacitive touch sensor layer to follow a shape of the non-flat touch surface.

2. The apparatus of claim 1, wherein said user interface layer and said capacitive touch sensor layer are parts of a user interface module.

3. The apparatus of claim 1, wherein said capacitive touch sensor layer is made of a semiconducting material.

4. The apparatus of claim 1, wherein said capacitive touch sensor layer is manufactured by molding.

5. The apparatus of claim 1, wherein said apparatus is an electronic device configured for wireless communications.

6. An apparatus of claim 1, wherein said uniform capacitance level is further provided by modulating a dielectric constant of said material between said non-flat touch surface and said capacitive touch sensor layer.

7. The apparatus of claim 6, wherein said modulating the dielectric constant is provided by using a higher dielectric constant material between said non-flat touch surface and said capacitive touch sensor layer in corresponding areas if a distance between said non-flat touch surface and said capacitive touch sensor layer in said corresponding areas is larger than in other areas between said non-flat touch surface and said capacitive touch sensor layer.

8. The apparatus of claim 6, wherein said uniform capacitance level is provided by using simultaneously said modulating the distance between said non-flat touch surface and said capacitive touch sensor layer and said modulating the dielectric constant.

9. The apparatus of claim 1, wherein said material comprises materials with a dielectric constant.

10. A user interface module, comprising:
- a user interface layer comprising a non-flat touch surface;
- a capacitive touch sensor layer, located outside of and non-touching said user interface layer along portions of the capacitive touch sensor layer, and configured to provide a sensor signal using a uniform capacitance threshold level for capacitive touch sensing at the non-flat touch surface; and
- material between said non-flat touch surface and said capacitive touch sensor layer, wherein the combination of said capacitive touch sensor layer and said material is configured to provide a uniform capacitance level at the non-flat touch surface, wherein said uniform capacitance level is provided, at least partly, by modulating a distance between said non-flat touch surface and said capacitive touch sensor layer by bending said capacitive touch sensor layer to follow a shape of the non-flat touch surface, and
- wherein said user interface module is configured to be used with an electronic device.

11. The user interface module of claim 10, wherein said user interface module is a part of said electronic device.

12. The user interface module of claim 10, wherein said user interface module is connected to said electronic device by an electrical or a wireless connection.

13. The user interface module of claim 10, wherein said capacitive touch sensor layer is made of a semiconducting material.

14. The user interface module of claim 10, wherein said capacitive touch sensor layer is manufactured by molding.

15. The user interface module of claim 10, wherein said uniform capacitance level is further provided by modulating a dielectric constant of said material between said non-flat touch surface and said capacitive touch sensor layer.

16. The user interface module of claim 15, wherein said modulating the dielectric constant is provided by using a higher dielectric constant material between said non-flat touch surface and said capacitive touch sensor layer in corresponding areas if a distance between said non-flat touch surface and said capacitive touch sensor layer in said corresponding areas is larger than in other areas between said non-flat touch surface and said capacitive touch sensor layer.

17. The user interface module of claim 15, wherein said uniform capacitance level is provided by using simultaneously said modulating the distance between said non-flat touch surface and said capacitive touch sensor layer and said modulating the dielectric constant.

18. The user interface module of claim 10, wherein said material comprises materials with a dielectric constant.

19. A method, comprising:
- detecting a touch on or near proximity to a non-flat touch surface of a user interface layer by an object; and
- providing by a capacitive touch sensor layer a sensor signal using a uniform capacitance threshold level for capacitive touch sensing at the non-flat touch surface, wherein the combination of said capacitive touch sensor layer and material between said non-flat touch surface and capacitive touch sensor layer is configured to provide a uniform capacitance level at the non-flat touch surface, wherein said uniform capacitance level is provided, at least partly, by modulating a distance between said non-flat touch surface and said capacitive touch sensor layer by bending said capacitive touch sensor layer to follow a shape of the non-flat touch surface; and
- said capacitive touch sensor layer being located outside of and non-touching said user interface layer along portions of the capacitive touch sensor layer.

20. The method of claim 19, wherein said user interface layer and capacitive touch sensor layer are parts of a user interface module.

21. A method of claim 19, wherein said uniform capacitance level is further provided by modulating a dielectric constant of said material between said non-flat touch surface and said capacitive touch sensor layer according to a predetermined criterion.

22. The method of claim 21, wherein said modulating the dielectric constant is provided by using a higher dielectric constant material between said non-flat touch surface and said capacitive touch sensor layer in corresponding areas if a distance between said non-flat touch surface and said capacitive touch sensor layer in said corresponding areas is larger than in other areas between said non-flat touch surface and said capacitive touch sensor layer.

23. The method of claim 21, wherein said uniform capacitance level is provided by using simultaneously said modulating the distance between said non-flat touch surface and said capacitive touch sensor layer and said modulating the dielectric constant.

24. The method of claim 19, wherein said material comprises materials with a dielectric constant.

* * * * *